US012633231B1

(12) United States Patent
Marioni

(10) Patent No.: US 12,633,231 B1
(45) Date of Patent: May 19, 2026

(54) SYSTEMS AND METHODS FOR ON-DEVICE ORAL READING FLUENCY EVALUATION AND ADAPTIVE FEEDBACK

(71) Applicant: Marino Marioni, Mill Valley, CA (US)

(72) Inventor: Marino Marioni, Mill Valley, CA (US)

( * ) Notice: Subject to any disclaimer, the term of this patent is extended or adjusted under 35 U.S.C. 154(b) by 0 days.

(21) Appl. No.: 19/390,749

(22) Filed: Nov. 17, 2025

Related U.S. Application Data

(63) Continuation of application No. 19/358,706, filed on Oct. 15, 2025.

(51) Int. Cl.
| | |
|---|---|
| *G09B 17/00* | (2006.01) |
| *G06V 20/50* | (2022.01) |
| *G06V 20/70* | (2022.01) |
| *G10L 15/02* | (2006.01) |
| *G10L 15/18* | (2013.01) |

(52) U.S. Cl.
CPC ........... *G09B 17/003* (2013.01); *G06V 20/50* (2022.01); *G06V 20/70* (2022.01); *G10L 15/02* (2013.01); *G10L 15/1807* (2013.01)

(58) Field of Classification Search
CPC .............................. G09B 17/003; G06F 40/284
See application file for complete search history.

(56) References Cited

U.S. PATENT DOCUMENTS

| | | | |
|---|---|---|---|
| 6,055,498 A | 4/2000 | Neumeyer | |
| 6,226,611 B1 | 5/2001 | Neumeyer | |
| 7,455,522 B2 * | 11/2008 | Polanyi | ................... G09B 7/02 |
| | | | 434/178 |
| 8,494,857 B2 * | 7/2013 | Pakhomov | .............. G10L 17/26 |
| | | | 704/271 |
| 8,568,144 B2 * | 10/2013 | Morrison | ................. G09B 5/06 |
| | | | 434/167 |
| 9,576,593 B2 * | 2/2017 | Pakhomov | .............. G10L 15/02 |
| 9,652,991 B2 | 5/2017 | Wang | |
| 9,754,503 B2 | 9/2017 | Feng | |

(Continued)

OTHER PUBLICATIONS

Shriberg, E.; Stolcke, A. Prosody modeling for speech recognition and understanding. 1997. SRI International, Menlo Park, CA, USA.
Kelly, A.; Burdine, C.; Rishikesh, S.; Waite, V. Fluency Assessment Platform for Child Speech. Interspeech 2020, ISCA, Shanghai, China, 2020.
Laughlin, B.; Beigman Klebanov, B. ETS Research Memorandum RM-24-01. 2024. ETS, Princeton, NJ, USA.

(Continued)

*Primary Examiner* — Peter R Egloff
(74) *Attorney, Agent, or Firm* — Mooney IP

(57) ABSTRACT

Systems and methods for on-device oral reading fluency evaluation and adaptive feedback. A device captures audio and runs automatic speech recognition (ASR) in an isolated environment. A schema-restricted interface exposes only tokens, per-token timestamps, and per-token confidence values, and excludes raw audio and model-internal signals. An acoustic front end extracts prosodic features as a first vector. A text and timing path derives indicators from ASR metadata as a second vector. Gates check confidence, alignment, coverage, and prosodic quality. On-device dual-path fluency evaluation with quality gating controls adaptation. When a gate fails, the device outputs a reason-coded quality flag and holds adaptation. When gates pass, fusion of the vectors produces a normalized fluency value. Reading-level adaptation uses dual thresholds and limits change to one step per prompt. Outcomes and metadata remain encrypted on device. No assessment data leave the device.

26 Claims, 4 Drawing Sheets

(56) References Cited

U.S. PATENT DOCUMENTS

| | | | |
|---|---|---|---|
| 9,799,228 B2 | 10/2017 | Chen | |
| 10,332,417 B1 * | 6/2019 | Brown | G09B 5/12 |
| 10,755,595 B1 | 8/2020 | Chen | |
| 11,887,497 B2 | 1/2024 | Theobald | |
| 12,046,147 B2 * | 7/2024 | Krishnaswamy | G06F 40/284 |
| 12,315,500 B2 | 5/2025 | Cheng | |
| 2010/0028846 A1 * | 2/2010 | Cohen | G09B 15/00 |
| | | | 434/323 |
| 2010/0145698 A1 * | 6/2010 | Chen | G09B 19/06 |
| | | | 704/256.1 |
| 2018/0158365 A1 * | 6/2018 | Roche | G09B 5/067 |
| 2022/0199071 A1 | 6/2022 | Voss | |
| 2023/0377749 A1 * | 11/2023 | Berisha | G10L 25/66 |
| 2024/0428056 A1 * | 12/2024 | Rubenstein | G06N 3/0475 |

OTHER PUBLICATIONS

Wang, S.; Loukina, A.; Tao, J. Automated Scoring of Nonnative Speech Using the SpeechRater system. ETS, Princeton, NJ, USA, 2015.

Duolingo English Test. Technical Manual. 2023. Duolingo, Pittsburgh, PA, USA.

Read Naturally. ClearFluency overview brochure. 2024. Read Naturally, St. Paul, MN, USA.

Google. Read Along product overview. 2021. Google LLC, Mountain View, CA, USA. URL: https://readalong.google/.

TSLP. Two Methods for Assessing Oral Reading Prosody. 2019. Publisher and city unknown.

* cited by examiner

SYSTEMS AND METHODS FOR ON-DEVICE ORAL READING FLUENCY EVALUATION AND ADAPTIVE FEEDBACK

CROSS-REFERENCE TO RELATED APPLICATIONS

This application is a continuation of U.S. patent application Ser. No. 19/358,706, filed Oct. 15, 2025, entitled "Systems and Methods for On-Device Oral Reading Fluency Evaluation and Adaptive Feedback," the entire contents of which are incorporated by reference herein.

TECHNICAL FIELD

This disclosure relates to on-device speech and education technology, particularly on-device architectures that evaluate oral reading fluency and provide adaptive feedback.

BACKGROUND

Oral reading fluency evaluation involves capturing speech and deriving timing and accuracy measures. Executing evaluation on-device involves clear separation of components and minimized data exposure. This disclosure describes an on-device architecture in which an automatic speech recognition (ASR) component is isolated and communicates through a schema-restricted interface, validated against a device-stored schema, that exposes only tokens, per-token timestamps, and per-token confidence values, and excludes raw audio and model-internal signals. Prosodic features are computed locally from captured audio on a separate path. Textual and timing indicators are computed solely from ASR-derived metadata provided through the schema-restricted interface. Device-stored gates regulate whether evaluation proceeds. A deterministic state-transition controller governs gating, timing, retries, and reading-level adaptation under device-stored policies and a latency budget, with utterance end identified by an acoustic front end. The system fuses the two final vectors for evaluation and, when permitted by device-stored gates, performs scoring under a monotonic grading function. The evaluation outcome and any fluency-metadata set are stored in encrypted device-local memory within a retention window. In some embodiments, a vision encoder supplies non-text semantic descriptors for prompt generation, with optical character recognition excluded.

Conventional approaches often emphasize fluency or pronunciation scoring as a primary output, sometimes using phone-level posterior features or server-side processing. Such approaches can conflate scoring with evaluation control and can increase data exposure. Accordingly, the present disclosure treats fluency evaluation as an on-device control problem that separates capture, gating, and adaptation from any particular scoring formulation and determines if and when scoring occurs under device-stored gates and policies.

References to conventional systems are provided for context only and are not admitted to be prior art.

SUMMARY

In one aspect, a computer-implemented system executes entirely on a local device to evaluate oral reading fluency and provide adaptive feedback. A reading prompt is presented and a spoken response is captured. An automatic speech recognition (ASR) component operates in an isolated environment and communicates only through a schema-restricted interface that exposes tokens, per-token timestamps, and per-token confidence values, excluding raw audio and model-internal signals.

The system is configured to operate without transmitting captured audio or any personally identifiable information (PII) or biometric data to an external system.

Embodiments focus on an on-device fluency evaluation architecture that governs capture, gating, retries, adaptation, and privacy. Scoring is an optional outcome: responsive to the gates passing, one or more scores may be produced; responsive to a gate failing, scoring may be withheld; and no particular pronunciation-scoring metric is required.

The device computes a first feature vector from prosodic features extracted from the audio and a second feature vector solely from ASR-derived metadata by deriving textual and timing indicators such as per-token correctness, text-to-audio alignment error relative to an expected token-timing schedule, tokens-correct-per-minute (TCPM), and a sentence-level confidence measure. Device-stored gates evaluate per-token confidence, alignment error, speech-coverage fraction, sentence-level confidence, and prosodic-quality conditions. When a gate fails, scoring is withheld and a reason-coded quality flag is emitted. The disclosure emphasizes on-device evaluation orchestration, including gating, retries, and adaptation. Pronunciation-specific scoring is not required, and scores are emitted only when the gates have passed.

Responsive to the gates passing, a predetermined combination function fuses only the two final vectors to produce a composite score. A grading function with session-fixed, monotonic parameters maps the composite score to a normalized fluency score. A deterministic state-transition controller governs capture, evaluation, latency within a device-stored budget measured from the utterance end detected by the acoustic front end and retry controls. Assessment data, including any fluency-metadata set and evaluation outcome, are stored in encrypted device-local memory purgeable within a retention window and are not transmitted to any external system.

In some embodiments, dual thresholds on the normalized fluency score and the sentence-level ASR confidence gate reading-level adaptation via a reading-level adapter and a reading-level map that bounds sentence token count, token-frequency band, and syntactic depth, subject to a difficulty step limit. Profiles keyed by a local, non-biometric identifier remain device-resident, and profile-derived parameters remain session-fixed. Before display or playback, outputs may be validated against a device-stored content policy and schema with fallback substitution.

In some embodiments, the system detects an engagement condition, such as a pitch-variance metric below a device-stored minimum or an RMS-energy variance metric below a device-stored minimum, computed solely from prosodic features and without classifying emotion, to suppress adaptation and present a retry with adjusted tone under device-stored policies. The analysis paths are hard-walled: the prosody path does not access ASR tokens, per-token timestamps, or per-token confidence values, and the text/timing path does not access the captured audio or any acoustic feature. Fusion occurs only after both paths complete.

In certain embodiments, a vision encoder supplies non-text semantic descriptors for prompt generation, optical character recognition being excluded. Descriptors are validated and purged within the retention window. Method and non-transitory computer-readable medium embodiments implementing the foregoing are also described.

Figure 1:
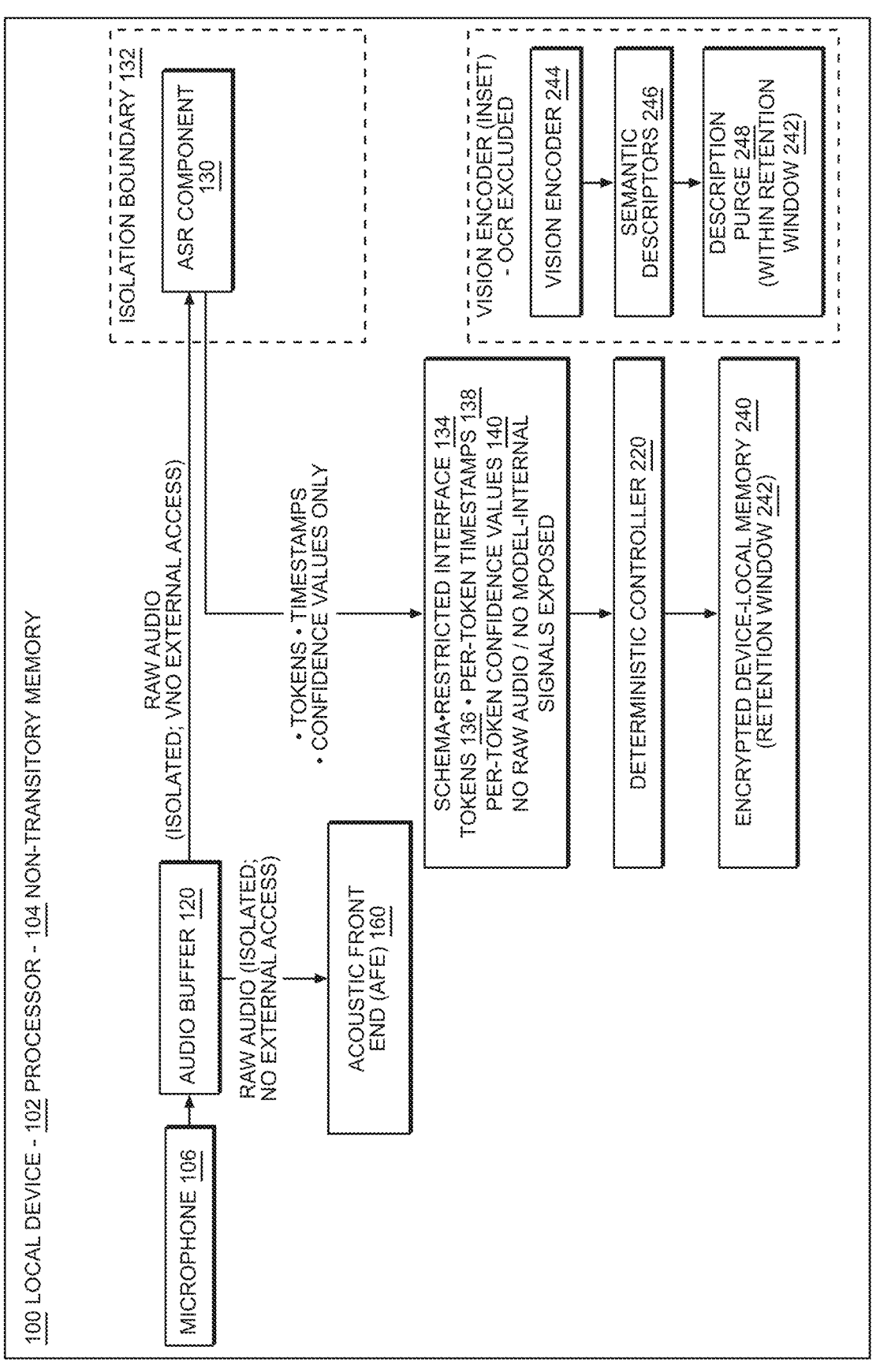
FIG. 1 is a block diagram illustrating a local device. A microphone feeds an audio buffer. An ASR component executes in an isolated process. A schema-restricted interface exposes tokens, per-token timestamps, and per-token confidence values only, and no raw audio or model-internal signals cross the interface. An acoustic front end runs on the same audio in parallel. A deterministic controller oversees flow. Encrypted device-local memory retains results within a retention window. An inset illustrates a vision encoder that outputs semantic descriptors and purges them within the retention window. Optical character recognition is excluded.

REFERENCE NUMERALS 100 local device
102 processor
104 non-transitory memory
106 microphone
108 speaker
110 camera
120 audio buffer
130 ASR component
132 isolation boundary 134 schema-restricted interface
136 tokens
138 per-token timestamps
140 per-token confidence values
150 expected timing schedule
152 alignment function
154 segmentation markers
156 lexical-unit segmenter
160 acoustic front end (AFE)
162 voice-activity detector (VAD)
164 pause metric
166 fundamental frequency (F0)
168 RMS energy
170 first feature vector
172 second feature vector
174 text and timing indicators
175 token-frequency list
176 sentence-level confidence calculator
177 high-frequency weighting
178 tokens-correct-per-minute (TCPM) calculator
180 gate evaluator
182 confidence gate
184 alignment-error gate
185 prosodic-quality gate
186 speech-coverage gate
188 sentence-level confidence gate
190 quality flag
192 reason code
200 fusion function
202 composite score
210 grading function
212 normalized fluency score
214 content policy validator
220 deterministic controller
222 session-state vector
224 tool allowlist
226 latency budget timer
227 maximum retry count
228 retry suppression window
229 retry gate thresholds
230 reading-level adapter
232 reading-level map
234 difficulty step limit
236 profile store
238 profile identifier
240 encrypted device-local memory
242 retention window
244 vision encoder (inset)
246 semantic descriptors
248 descriptor purge

DETAILED DESCRIPTION

The embodiments described herein can be implemented entirely on a local device without transmitting captured audio or any personally identifiable information (PII), biometric identifiers, or biometric templates to any external system. The figures are schematic and not to scale. Like numerals refer to like elements throughout.

Overview of the Device Architecture

Referring to FIG. 1, a local device (100) includes at least one processor (102) and non-transitory memory (104). The device receives audio from a microphone (106), may present audio via a speaker (108), and may capture images via a camera (110). Captured audio is buffered in an audio buffer (120). In some embodiments, a text-to-speech (TTS) component executes entirely on the device to render prompts or feedback, and audio produced by the text-to-speech (TTS) component is not transmitted off-device.

An automatic speech recognition component (130) executes within an isolation boundary (132). The ASR component communicates with the remainder of the system only through a schema-restricted interface (134) that exposes tokens (136), per-token timestamps (138), and per-token confidence values (140), and excludes raw audio, embeddings, logits, per-frame acoustic features, and other model-internal signals. In parallel, an acoustic front end (160) operates on the audio from the audio buffer (120).

A deterministic state-transition controller (220) coordinates operations according to a session-state vector (222) and device-stored policies. Assessment data and profiles are written to encrypted device-local memory (240) and purged within a retention window (242). In some embodiments, an inset module comprises a vision encoder (244) that outputs non-text semantic descriptors (246) for prompt generation; descriptors are validated and purged (248) and optical character recognition is excluded.

Audio Capture, ASR Isolation, and Schema-Restricted Interface

During a session, the device records a spoken response into the audio buffer (120). The same audio is provided to the ASR component (130) and to the acoustic front end (160). The ASR component emits, through the schema-restricted interface (134), tokens (136) in reading order with associated per-token timestamps (138) and per-token confidence values (140). No raw audio or model-internal signals cross the interface. The interface is validated against a device-stored schema and may be versioned to ensure that only the allowed fields are accepted.

Figure 2:
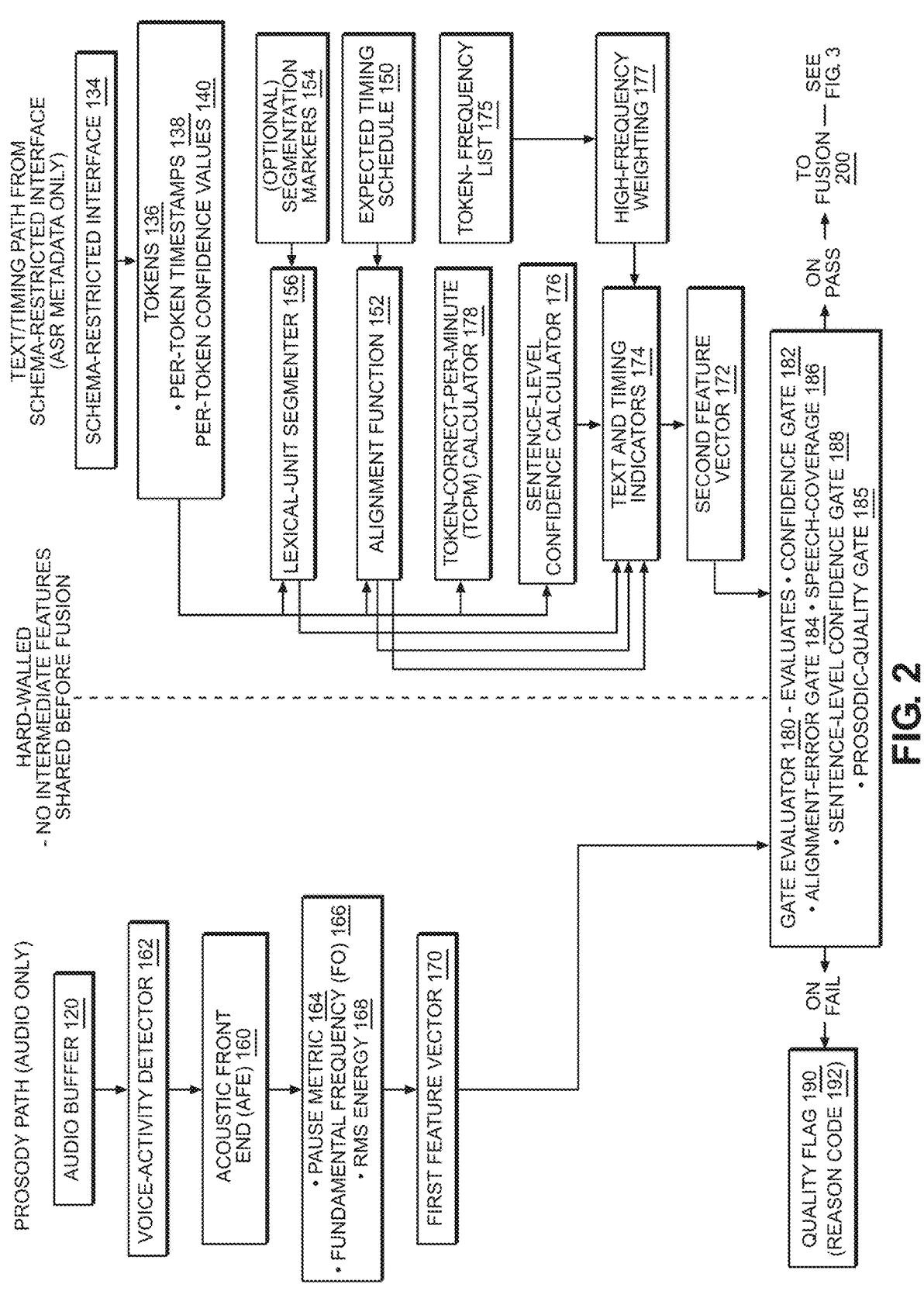
FIG. 2 is a data flow diagram illustrating two parallel paths. A first path derives prosodic features via an acoustic front end (AFE) to form a first feature vector. A second path derives textual and timing indicators solely from ASR tokens, per-token timestamps, and per-token confidence values to form a second feature vector, including alignment error against an expected timing schedule, tokens-correct-per-minute (TCPM), and a sentence-level confidence measure derived solely from the per-token confidence values and timestamps. Device-stored gates evaluate confidence, alignment error, speech-coverage fraction, sentence-level confidence, and a prosodic-quality gate. Responsive to any gate failing, the system withholds scoring and emits a reason-coded quality flag. The two analysis paths are hard-walled; no intermediate features are shared between the prosody path and the text/timing path prior to fusion. The AFE may include a voice-activity detector (162).

Dual Analysis Paths and Device-Stored Gates (FIG. 2)

Prosody path. As shown in FIG. 2, in some embodiments, a voice-activity detector (162) identifies speech and silence segments subject to a device-stored minimum silence length. In other embodiments, the acoustic front end (160) computes segments from energy and timing without a separate VAD. From the detected or inferred regions, the acoustic front end (160) computes a pause metric (164), fundamental frequency (F0) (166) and F0 variation, and root-mean-square energy (168) and energy variation. These prosodic features are assembled into a first feature vector (170). In some embodiments, speech-coverage fraction is computed by the acoustic front end.

Text and timing path. In parallel, textual and timing indicators (174) are derived solely from ASR-derived metadata received through the schema-restricted interface (134). An alignment function (152) compares the per-token timestamps (138) with an expected timing schedule (150) to produce a text-to-audio alignment error. A tokens-correct-per-minute calculator (178) computes TCPM from correct tokens over elapsed time between first token start and last token end. A sentence-level confidence calculator (176) derives a sentence-level confidence measure solely from the per-token confidence values (140) and the per-token timestamps (138), optionally using segmentation markers (154). A lexical-unit segmenter (156) defines lexical units from punctuation rules, silence gaps that exceed a device-stored minimum, or segmentation markers (154), and associates start and end timestamps to each lexical unit. In some embodiments, a token-frequency list (175) informs high-frequency weighting (177) applied to indicators for tokens designated as high-frequency. The indicators are assembled into a second feature vector (172). The prosody path and the text/timing path operate independently and do not exchange intermediate features or parameters.

In one embodiment, the text-to-audio alignment error E is computed solely from the allowed timestamps by comparing token midpoints to an expected token-timing schedule:

$$E=(1/N)*\text{sum\_}\{i=1 \ldots N\}\text{abs}(((t\_start\_i+t\_end\_i)/2)-t\_hat\_i)$$

A sentence-level confidence C_s is derived solely from per-token confidence values with optional duration weighting:

$$w\_i=(t\_end\_i-t\_start\_i)$$

$$C\_s=(\text{sum\_}\{i=1 \ldots N\}(w\_i*c\_i))/(\text{sum\_}\{i=1 \ldots N\}w\_i)$$

where $t\_start\_i$ and $t\_end\_i$ are per-token timestamps; $t\_hat\_i$ is the device-stored expected midpoint; $c\_i$ is the per-token confidence; $w\_i$ is the token duration; N is the token count; abs(x) denotes absolute value; and sum_{i=1 . . . N} denotes summation over tokens 1 through N. Thresholds used for gating are device-stored. A language-specific, versioned frequency list assigns tokens to frequency bands; indicators associated with designated high-frequency tokens receive increased weight to emphasize foundational decoding fluency. The list is constructed by projecting device-stored word lists through the device tokenizer and merging with on-device corpus statistics under device-stored construction rules.

Gates. A gate evaluator (180) evaluates device-stored gates prior to any scoring. Gates may include a confidence gate (182) that compares per-token confidence values to a threshold, an alignment-error gate (184) that compares the alignment error to a limit, a speech-coverage gate (186) that compares speech-coverage fraction to a minimum, and a sentence-level confidence gate (188) that compares sentence-level confidence to a threshold. A prosodic-quality gate (185) evaluates conditions derived solely from prosodic features, such as background-noise level exceeding a device-stored maximum, a pitch-variance metric falling below a device-stored minimum, or a pause-duration metric exceeding a device-stored maximum. When any gate fails, the system withholds scoring and emits a quality flag (190) with an associated reason code (192). In some embodiments, gates are computed at both lexical-unit and sentence levels.

The acoustic front end operates only on captured audio. The alignment function and all text and timing indicators operate only on ASR-derived tokens, per-token timestamps, and per-token confidence values.

As used herein, gates passing means that a device-stored predicate over the set of enabled gates is satisfied; unless otherwise specified, the predicate is defined by device policy and may be satisfied without every gate passing.

4. Fusion and Grading (FIG. 3)

Figure 3:
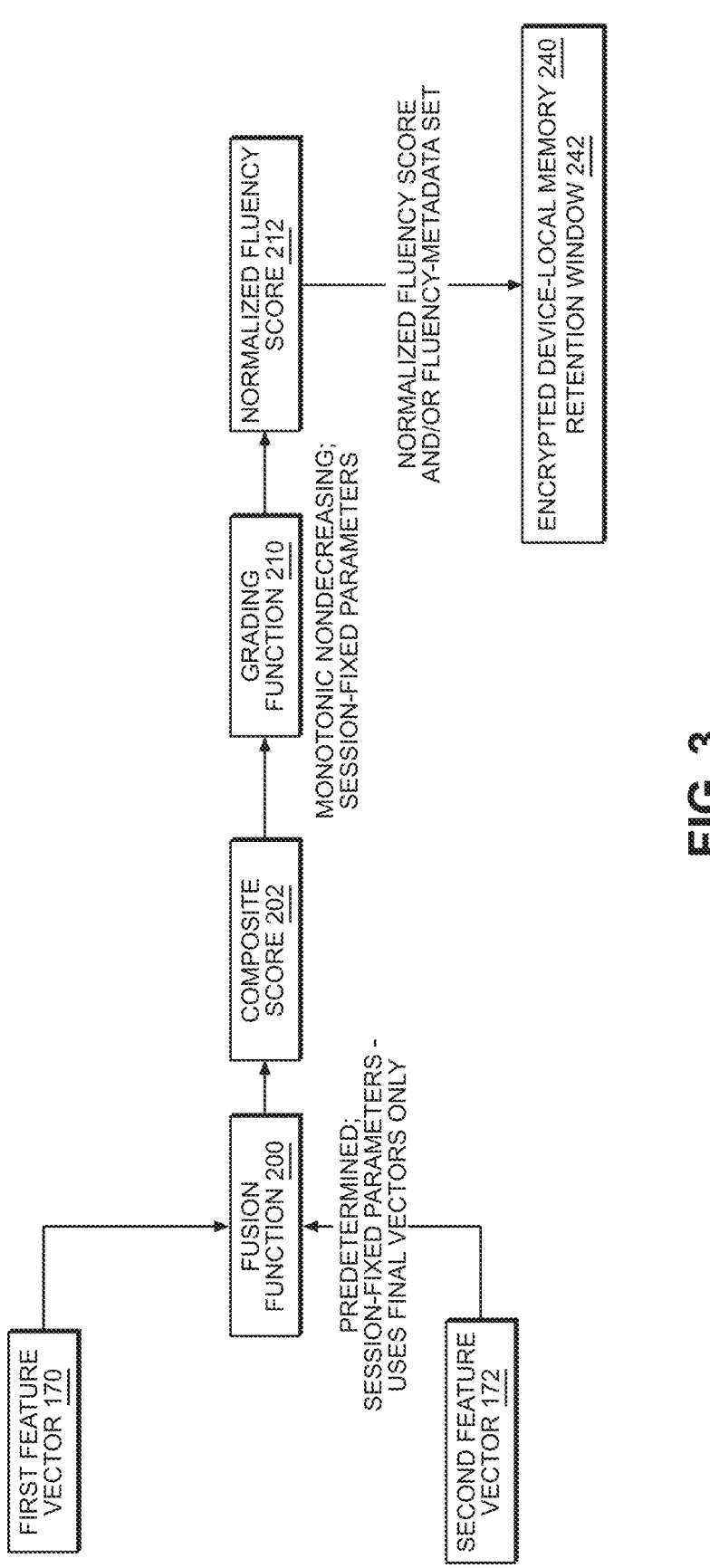
FIG. 3 is a block diagram illustrating fusion and grading. A predetermined function fuses the first and second feature vectors using final vectors only, with session-fixed parameters. A grading function maps the composite score to a normalized fluency score with session-fixed, monotonic parameters. The outcome is stored in encrypted device-local memory (240) within the retention window.

Referring to FIG. 3, responsive to the gates passing, a fusion function (200) combines only the final outputs of the first feature vector (170) and the second feature vector (172) to produce a composite score (202). The fusion parameters can remain session-fixed. A grading function (210) maps the composite score to a normalized fluency score (212) using a monotonic nondecreasing mapping whose parameters remain session-fixed during the evaluation session. The evaluation outcome, including the normalized fluency score and any fluency-metadata set, is written to encrypted device-local memory (240).

5. Deterministic Control, Retries, and Reading-Level Adaptation (FIG. 4)

Figure 4:
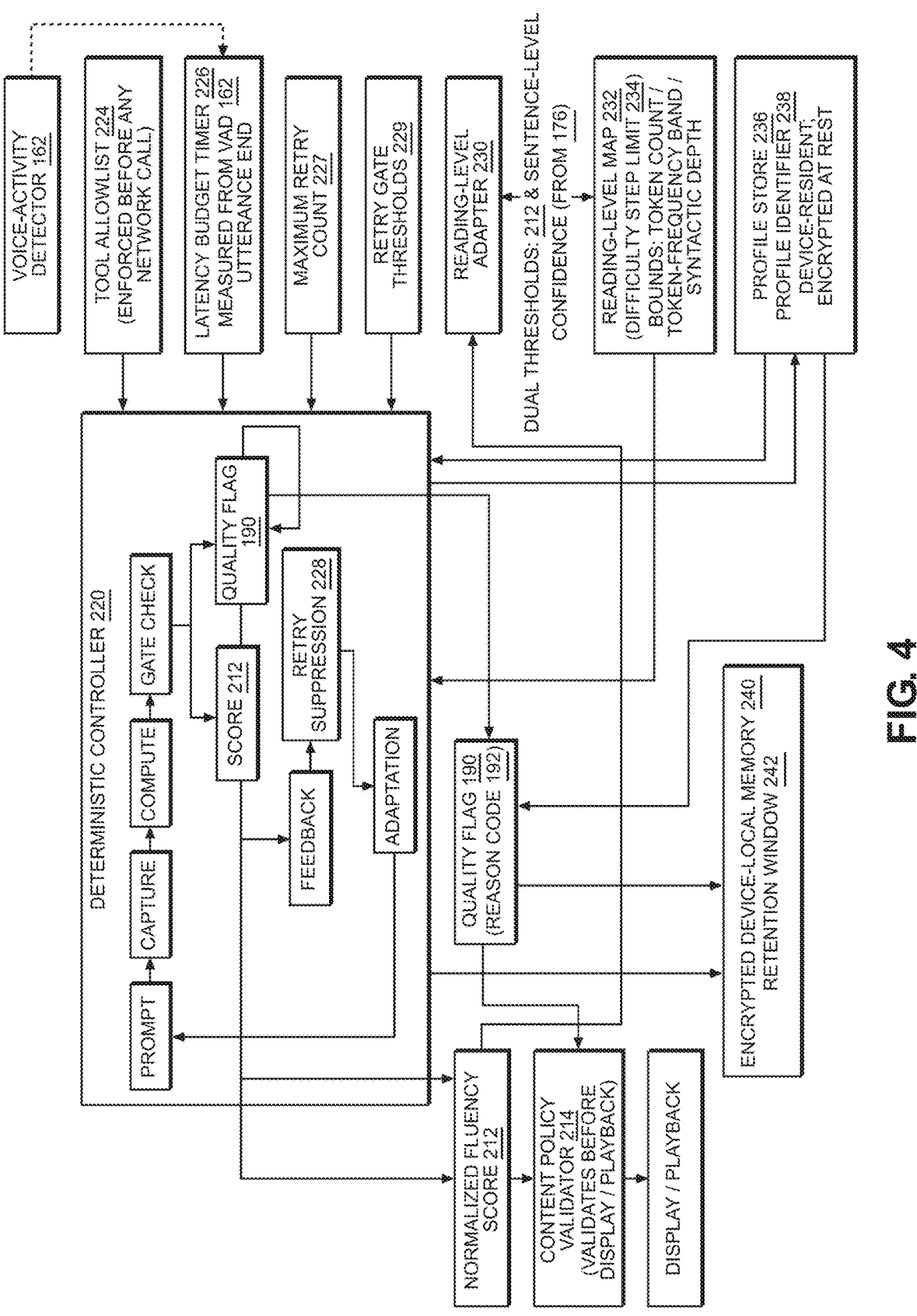
FIG. 4 is a control and adaptation diagram. The deterministic state-transition controller (220) manages prompt, capture, compute, gate check, score or quality flag, feedback, retry suppression, and adaptation. A tool allowlist and a latency budget timer enforce policy, with the latency budget measured from the utterance end as identified by an acoustic front end (160). A maximum retry count and retry gate thresholds control retries. Dual thresholds on the normalized fluency score and the sentence-level confidence are used to gate reading-level adaptation. A reading-level map limits difficulty changes to one step and bounds token count, token-frequency band, and syntactic depth. Local profiles load at session start and are never transmitted off-device. A content policy validator checks outputs before display or playback.

As shown in FIG. 4, the deterministic state-transition controller (220) advances among predefined states using the session-state vector (222) and device-stored policy. The controller enforces a tool allowlist (224) that constrains callable tools and models, and a latency budget timer (226) measured from the utterance end as identified by an acoustic front end (160) to output either the normalized fluency score (212) or the quality flag (190) within a device-stored latency budget. The controller enforces a retry suppression window (228) and a maximum retry count (227) per sentence or utterance, and applies retry gate thresholds (229) so that retries are presented only when device-stored retry conditions are satisfied. The tool allowlist (224) is enforced prior to any network invocation and blocks any call path capable of emitting captured audio, ASR-derived metadata, profile contents, or any other disallowed fields.

Latency budget. A device-stored timer starts at the utterance end as identified by the acoustic front end. The timer enforces a maximum interval so that either a normalized fluency score or a quality flag is configured to be output substantially instantaneously to the user. The length of the interval may vary by device performance or policy and is generally on the order of a fraction of a second. If the interval elapses, the controller outputs a quality flag with a timeout reason code rather than a delayed score.

Engagement vs. scoring. When an engagement condition is detected (e.g., pitch-variance metric below a device-stored minimum, low RMS-energy variance, or extended pauses), the system suppresses adaptation and presents a retry; engagement is not used as a scoring feature and no emotion classification is produced.

Supported-language gate. If the detected spoken language is not in the device-stored supported-language list, the controller withholds scoring and emits a quality flag with a language-mismatch reason code.

Local auditability (optional but supported). A local audit log records state transitions, gate outcomes, reason codes, retries, and timing events with integrity protection, is encrypted at rest, and is purged within the retention window.

Reading-level adaptation is gated by dual thresholds requiring that both the normalized fluency score (212) and the sentence-level confidence from (176) meet respective device-stored thresholds. Responsive to both thresholds being met, a reading-level adapter (230) consults a reading-level map (232) to adjust at most one difficulty step per prompt according to a difficulty step limit (234) and to set bounds, which may include sentence token-count range, token-frequency band, and syntactic depth. A profile store (236) maintains user profiles keyed by a local, non-biometric profile identifier (238). Profiles and adaptation parameters remain device-resident and are encrypted at rest in storage (240).

5A. Dynamic Comprehension Prompting

The device periodically presents a comprehension prompt generated on the device and constrained to reference only entities, events, or vocabulary that appeared in a most recent transcription aligned to a device-stored expected token sequence, or that appear in a device-stored allowed topic list. The device receives a spoken response and determines, using only ASR tokens, per-token timestamps, and per-token confidence values and without storing raw audio, whether the spoken response satisfies a device-stored token-equivalence rule relative to an expected token sequence derived from the most recent transcription, and updates a device-stored profile. Based on the determination and subject to a device-stored policy that limits difficulty changes to at most one step per prompt, the device advances the session or generates a simplified restatement and re-asks a simplified prompt. All operations execute on the device, and no voice data, transcripts, or results are transmitted.

In some embodiments, the controller inserts a comprehension prompt after one or more fluent spoken responses per device-stored thresholds on accuracy and pace.

In some embodiments, the comparison uses device-stored synonym lists and thresholds.

6. Optional Vision-Assisted Prompt Generation

In some embodiments, the device receives an image or video frame via the camera (110) and a vision encoder (244) produces non-text semantic descriptors (246) with associated confidences. Optical character recognition is excluded. Descriptors are validated against a device-stored schema and content policy. Descriptors that fail validation or fall below a confidence threshold are discarded, and descriptor purge (248) occurs within the retention window (242). A content policy validator (214) is configured to validate prompts prior to display or playback and may substitute a device-stored fallback responsive to validation failure. Prompt lexical difficulty can be mapped from the evaluation outcome using the reading-level map (232) subject to the difficulty step limit (234).

7. Implementation Notes and Variations

The deterministic state-transition controller (220) is configured to schedule computations in parallel when the session-state vector (222) indicates that captured audio is available and ASR metadata has been received through the schema-restricted interface (134). The tool allowlist (224) is stored on the device and is versioned. The system is configured to enforce a supported-language list so that when the spoken response does not match a supported language, scoring is withheld and a quality flag (190) is emitted with an associated reason code (192). In some embodiments, the content policy validator (214) or an equivalent telemetry policy validator enforces a device-stored telemetry schema that permits only de-identified aggregate diagnostics and blocks any field containing captured audio, ASR-derived metadata, fluency-metadata sets, evaluation outcomes, adapted prompt parameters, user profile contents, or personally identifiable information (PII), or any device or advertising identifiers or other persistent identifiers (including hashed derivatives thereof) linkable to a natural person or a persistent device.

Telemetry (de-identified aggregate only). If any telemetry is sent off-device, it consists essentially of de-identified aggregate diagnostics (e.g., install counts, feature-usage counts, crash/error-code histograms, application version) and excludes captured audio, ASR-derived metadata, fluency-metadata sets, evaluation outcomes, adapted prompt parameters, user-profile contents, biometric data, precise geolocation, and any device or advertising identifiers or other persistent identifiers linkable to a person or persistent device.

Tokenization is performed using a device-stored tokenizer identified by a version string. The token-frequency list (175) can be language-specific and versioned, and can be constructed from device-stored word lists projected through the tokenizer and merged with on-device corpus statistics according to device-stored construction rules. The retention window (242) determines when recorded audio and intermediate features are purged from encrypted device-local memory (240). The system does not create or store biometric identifiers or biometric templates.

Engagement conditions can be detected solely from prosodic features within the first feature vector (170). For example, sustained low pitch variance or low RMS-energy variance or extended pauses can trigger the prosodic-quality gate (185), which withholds scoring and adaptation and may present a retry prompt subject to retry policies. In all cases, the prosody path and the text/timing path remain separate until fusion at (200).

Timestamps are seconds with millisecond precision. TCPM uses minutes as defined. A device-stored epsilon value prevents division by zero for short spans. All thresholds and weights are device-stored and remain session-fixed during an evaluation session.

8. Method Embodiments

In one method embodiment, the device presents a reading prompt and records a spoken response into the audio buffer (120). The same audio is concurrently provided to the ASR component (130) and to the acoustic front end (160). Through the schema-restricted interface (134), the device receives tokens (136) in reading order with per-token timestamps (138) and per-token confidence values (140). The device aligns the transcription to a device-stored expected token sequence using the per-token timestamps. The acoustic front end (160) computes prosodic features including pause metrics (164), fundamental frequency and its variation (166), RMS energy and its variation (168), and optionally speech-coverage fraction, to form the first feature vector (170).

The device computes a second feature vector (172) solely from the ASR-derived metadata by deriving textual and timing indicators (174) relative to the expected token sequence, including per-token correctness, insertion and omission rates, substitution rate, TCPM from (178), alignment error from (152) and (150), and sentence-level confidence from (176). Gates are evaluated by the gate evaluator (180), including gates (182), (184), (186), (188), and the prosodic-quality gate (185). Responsive to any gate failing, the device withholds scoring, emits a quality flag (190) with a reason code (192), and records a non-scored evaluation outcome.

Responsive to the gates passing, the device fuses the first and second feature vectors using the fusion function (200) to produce the composite score (202). The grading function (210) maps the composite score to the normalized fluency score (212) using parameters that remain session-fixed and monotonic nondecreasing. The evaluation outcome is stored in encrypted device-local memory (240) and remains purgeable within the retention window (242).

Adaptation decisions can be gated by dual thresholds applied to the normalized fluency score (212) and the sentence-level confidence from (176). When both thresholds are met, the reading-level adapter (230) updates prompt difficulty via the reading-level map (232) subject to the difficulty step limit (234). The deterministic state-transition controller (220) enforces the latency budget timer (226), the tool allowlist (224), the retry suppression window (228), the maximum retry count (227), and the retry gate thresholds (229).

9. Computer-Readable Medium Embodiment

In another embodiment, a non-transitory computer-readable medium stores instructions that, when executed by the processor (102), cause the device (100) to perform any of the methods described in this Detailed Description, including recording audio, receiving ASR-derived metadata through the schema-restricted interface (134), computing the first feature vector (170) and the second feature vector (172), evaluating gates (180), fusing (200) to produce the composite score (202), grading (210) to obtain the normalized fluency score (212), storing results in encrypted device-local memory (240), and applying adaptation via (230) and (232) subject to device-stored policies.

10. Advantages as Functional Effects

The architecture can reduce data exposure by limiting the interface to tokens (136), per-token timestamps (138), and per-token confidence values (140) while excluding raw audio and model-internal signals. On-device execution can bound end-to-end latency through the latency budget timer (226). Separation of analysis paths with fusion at (200) can improve robustness by preventing cross-contamination of intermediates. Device-stored gates (180) with reason-coded quality flags (190) can improve transparency of scoring conditions. Dual-threshold adaptation with the reading-level map (232) and difficulty step limit (234) can stabilize progression across prompts. All assessment data can remain in encrypted device-local memory (240) and be purged under the retention window (242).

Hard-wall dual-path robustness and privacy. The hard-wall separation between the prosody and the text/timing paths (e.g., no cross-access to inputs and no shared intermediates prior to fusion) reduces acoustic-text leakage and bias propagation, mitigates model-inversion risk, and enforces privacy because the text/timing path never accesses audio and the prosody path never accesses ASR tokens or confidences.

The foregoing description is intended to illustrate selected embodiments. Variations can be made without departing from the scope of the claims.

Definitions

Acoustic Front End (AFE)

Device-executed signal processing that operates on captured audio to identify speech regions and compute prosodic features used in fluency evaluation. The acoustic front end may apply pre-emphasis, filtering, automatic gain control, noise reduction, framing, and windowing. It may include one or both of a detector for speech-region identification, for example a voice-activity detector, and a feature extractor that computes prosodic features such as fundamental frequency (F0) and pitch contour, RMS energy, pause duration, and speech rate.

Alignment Function

A device-stored procedure that computes text-to-audio alignment error from per-token timestamps and a device-stored expected token-timing schedule, optionally using segmentation markers.

Aligned Transcription

A transcription that has been aligned to a device-stored expected token sequence. The alignment may occur inside the ASR before emission through the schema-restricted interface or on the device after receipt using the alignment function. In both cases the alignment uses only tokens, per-token timestamps, and per-token confidence values.

ASR-Derived Metadata

The fields provided via the schema-restricted interface: an ordered token sequence constituting the transcription as used herein, per-token timestamps, and per-token confidence values, with segmentation markers optional.

Automatic Speech Recognition (ASR) Component

An on-device component that emits only ASR-derived metadata via the schema-restricted interface, namely an ordered token sequence that constitutes the transcription, per-token timestamps, and per-token confidence values, and that does not expose model-internal signals or raw audio, executing in a separate process, container, or virtual machine, or via a restricted in-process interface (also referred to as a speech-to-text component).

Biometric Identifier

Data used to uniquely identify a person via biological or behavioral traits (e.g., voiceprint, face template, fingerprint). Excluded from generation, storage, or transmission.

Biometric Template

A machine-readable representation derived from a person's biological or behavioral characteristics (e.g., a voiceprint template). For privacy constraints in this disclosure, biometric template includes a voiceprint template.

Captured Audio

Audio recorded on the device during an evaluation session. Recorded audio is used synonymously.

Composite Score

Pre-normalization scalar computed from feature vectors.

Comprehension Prompt

A prompt generated and presented on the device. It is constrained to reference only entities, events, or vocabulary from a most recent transcription aligned to a device-stored expected token sequence, or from a device-stored allowed topic list. It is rendered as on-device text or audio playback. It expects one spoken response. Optical character recognition (OCR) is excluded unless expressly stated.

Content Policy

A device-stored set of rules used in output validation (e.g., reading-level bounds, tone constraints, personal-information filters).

Device-Local Memory

Memory on the device not accessible to external networks or remote processes.

Deterministic State-Transition Controller

A controller that advances among predefined states using device-stored guards (tool allowlist, latency budget, retry budget, schema or content validation) so the same inputs and state yield the same next state and side effects across runs.

De-Identified Aggregate Diagnostics

Telemetry derived from counts or statistical summaries (e.g., install counts, feature usage counts, crash rates, error-code histograms, app version, coarse device class) that exclude captured audio, ASR-derived metadata, fluency-metadata sets, evaluation outcomes, adapted prompt parameters, user profiles, and any PII or biometric data, and that comply with a device-stored de-identification policy.

Device-Stored Gating Functions

Locally enforced thresholds or limits, for example per-token confidence, alignment error, or speech-coverage fraction, that must be met before a fluency score is computed.

Difficulty Step

The maximum change in reading level per sentence. Default is one step up or down.

Encryption at Rest

On-device encryption of captured audio and intermediate features until purge completes under the retention window.

Engagement Condition

A device-stored threshold satisfied solely by prosodic features computed by the acoustic front end (AFE) (e.g., pitch-variance or RMS energy variance below a device-stored minimum, or pause duration above a device-stored maximum). When satisfied, the condition is treated as a non-fluency event and gates retries or adaptation; no emotion label is computed, stored, or displayed.

Evaluation Outcome

Either a reason-coded quality flag responsive to any enabled gate failing, or a normalized fluency score responsive to the gates passing; the outcome may include diagnostics. The system uses the evaluation outcome to gate retries and adaptation.

Evaluation Session

One continuous user session. It begins at the first prompt and ends when the session closes. Parameters marked session-fixed and grading weights do not change during this session.

Expected Token-Timing Schedule

A device-stored schedule of expected token start and end times for the target sentence used by the alignment function to compute text-to-audio alignment error.

Expected Tokens

Tokens designated as correct for a given comprehension prompt, derived on the device from the prompt text and stored or generated under device-stored rules and thresholds.

Feature Vector

The fixed-length numeric output of an analysis path. Vectors remain separate and are fused only after both are computed.

First or Second Feature Vector

Fixed-length numeric vectors produced by the respective analysis paths.

Fluency Evaluation

An on-device process that includes gating and fusion and a scoring subroutine implemented by the grading function that, responsive to the gates passing, outputs a normalized fluency score and, responsive to any enabled gate failing, outputs a reason-coded quality flag; the process may also produce diagnostics, flags, and control signals. Scoring is optional.

Fluency-Metadata Set

Device-local, non-audio assessment metadata derived during evaluation (whether or not a score is emitted), including one or more of the following: per-token correctness, substitution rate, insertion rate, omission rate, tokens-correct-per-minute (TCPM), pause metrics, sentence-level confidence, and quality flags. It excludes raw audio and model-internal signals.

Gate (Device-Stored)

A device-stored boolean condition evaluated from allowed inputs to permit or suppress scoring, adaptation, or progression.

Gates Passing

A device-stored predicate evaluated over the set of enabled gates. Unless otherwise specified, the predicate is defined by device policy and need not require that every gate be satisfied.

Grading Function (Monotonic; Session-Fixed)

A device-stored monotonic mapping from the composite score to a normalized fluency score. The parameters do not change during the session.

Hard-Walled

Architectural separation prohibiting cross-access to inputs and intermediates between the prosody path and the text/timing path prior to fusion.

High-Frequency Token

A token designated as high-frequency per the token-frequency list.

Integrity Protection

Detection of alteration of a local audit log entry via a cryptographic tag or equivalent mechanism.

Latency Budget

A device-stored maximum time from the acoustic front end to output of either a normalized fluency score or a quality flag.

Lexical Unit

A bounded sequence of tokens (e.g., sentence, clause, phrase) with start and end timestamps derived from per-token timestamps and boundaries set from punctuation rules, silence gaps exceeding a device-stored minimum, or ASR segmentation markers.

Logits

Raw, unnormalized numerical outputs of a neural network prior to application of any normalization or activation function. Logits are considered internal model values and are excluded from the schema-restricted interface.

Mapping Rule

The deterministic procedure the system uses to query the reading-level map. Same inputs yield the same outputs.

Maximum Retry Count

A device-stored limit on the number of retries permitted per sentence or utterance.

Model-Internal Signals

Internal ASR representations or parameters (e.g., embeddings, logits, layer activations, per-frame acoustic features).

Normalized Fluency Score

Reported score on a fixed scale (e.g., 0 to 100) used to drive user-visible outcomes.

Pause Duration

Maximum contiguous silence inside a lexical unit, measured on the VAD track using a device-stored minimum silence length.

Personally Identifiable Information (PII)

Information that directly identifies or can reasonably be used to identify a person, including names, persistent identifiers linked to a person, contact information, precise geo-location, and government identifiers. PII includes biometric identifiers and biometric templates as defined herein.

Per-Token Confidence Values

Numeric token confidences output by the ASR.

Per-Token Timestamps

Start and end times for each token measured on the captured-audio timeline in milliseconds or an equivalent time unit.

Pitch-Variance Metric

A prosodic metric defined as the variance of fundamental frequency (F0) across consecutive tokens within a lexical unit. Used as an affect indicator for retry gating and feedback adaptation.

Policy

A device-stored mapping from the session-state vector to the next instruction unit; it need not follow a fixed sequence.

Predetermined Combination Function:

A device-stored fusion of the first and second feature vectors into a composite score with session-fixed parameters. In some embodiments, fusion uses only the vectors' final outputs with no exchange of intermediate features or parameters between paths.

Prosodic Features

Features computed from captured audio that reflect speaking prosody, including at least fundamental frequency (F0) and F0 variation, RMS energy and RMS energy variation, pause duration, and speech rate.

Quality Flag

An indicator set when a device-stored gate or validation condition is not satisfied, recorded with a device-stored reason code.

Reading Level

A single number on a Lexile-style scale stored on the device. Higher number means harder text.

Reading-Level Adaptation

A device-stored policy action that changes the reading level by at most one difficulty step per sentence, gated by dual thresholds, using bounds supplied by the reading-level map.

Reading-Level Map

A device-stored table that takes the evaluation outcome as input and returns the next reading level, moved by at most one difficulty step, and the bounds for generation, including sentence token-count range, allowed token-frequency band or range, and a cap on syntactic depth. Versioned. Encrypted at rest. Device-local.

Reading Prompt

A prompt presented on the device for the user to read aloud or describe. It is rendered as on-device text, audio playback, displayed image, captured image or video frame, or live camera frame. It may be generated or constrained using on-device non-text semantic descriptors. Optical character recognition (OCR) is excluded unless expressly stated.

Reason Code

An enumerated device-stored value that states why a quality flag was set.

Retention Window

A device-stored maximum time after which recorded audio and intermediate features are purged from device-local storage.

Retry Prompt

A device-presented instruction to re-read the same prompt, a portion of it, or a constrained variant that preserves the target content while adjusting difficulty or tone when retry conditions are met.

Retry Suppression Window

A device-stored minimum time interval after a retry or score event during which additional retry prompts are suppressed.

Root-Mean-Square (RMS) Energy Variance

Variability in RMS energy computed across consecutive tokens or segments within a lexical unit.

Schema-Restricted Interface

A versioned interface validated against a device-stored schema. It exposes only tokens, per-token timestamps, and per-token confidence values, and excludes raw audio and model-internal signals (for example, embeddings, logits, and per-frame acoustic features). It may be realized as an inter-process channel, a message or file exchange, or a restricted in-process interface. In all cases, only the allowed fields are accessible.

Second Analysis Path (Text or Timing)

The path that processes only ASR-derived metadata to compute textual or timing indicators and outputs a second feature vector.

Segmentation Markers

Boundary indicators produced by the ASR that mark token, lexical-unit, or sentence boundaries.

Semantic Descriptors

Structured, non-text labels output by the vision encoder (e.g., {object: dog, action: running, attribute: brown, relation: dog on grass}) with associated confidence values.

15

Sentence-Level ASR Confidence Measure

A sentence or utterance confidence derived solely from per-token confidence values and timestamps, optionally using segmentation markers.

Session-State Vector

A device-local tuple of variables for the current evaluation session, including gate statuses, retry budgets, and adaptation flags.

Speech Rate

Reading rate computed from timestamps, expressed as tokens per minute or syllables per second.

Supported-Language List

A device-stored list of languages that, when not matched by the spoken response, causes scoring to be withheld and a quality flag to be emitted.

Syntactic Depth

A device-stored cap on sentence structural complexity, measured as maximum parse-tree depth or a bounded equivalent.

Text-to-Audio Alignment Error

Average absolute difference between each token midpoint and its expected midpoint from the device-stored timing schedule, computed solely from per-token timestamps and expected times.

Text-to-Speech (TTS) Component (Also Referred to as a Speech Synthesis Component)

A device-executed component that renders audio for prompts or feedback using only device-local inputs (e.g., text, phonemes, prosody tags) available on the device at runtime.

Token-Equivalence Rule

A device-stored rule or rule set that determines whether a spoken response corresponds to an expected token set using only ASR tokens, per-token timestamps, and per-token confidence values. The rule may include synonym or morphology normalization and duration or confidence weighting, and it excludes access to raw audio and model-internal signals.

Tokens vs. Words

Words are reporting aliases of tokens. Calculations use tokens.

TCPM (tokens-Correct-Per-Minute)

(#of correctly read tokens)/(elapsed time in minutes, measured from the first token start to the last token end). Insertions are excluded. Literature often uses WCPM (words-correct-per-minute). WCPM is a reporting alias computed by grouping tokens back to words with the device tokenizer. Elapsed time excludes silences longer than the device-stored minimum silence length.

Token-Frequency Band

A numbered band derived from the token-frequency list. Lower bands are more common tokens. Higher bands are rarer tokens. Bands guide generation and may weight text-path indicators.

Token-Frequency List (Language-Specific, Versioned)

A device-stored, language-specific, versioned table that assigns each token a frequency rank. The table is built by projecting device-stored word lists such as Dolch and Fry through the device tokenizer and by merging with on-device corpus token statistics. All construction rules are device-stored and versioned.

Tokenizer

A device-stored tokenizer identified by a version string. All tokenization in this disclosure uses this version.

Tool Allowlist

A device-stored list of tools or models callable from a given state. Non-allowlisted calls are rejected.

16

Tokens

ASR output units (words or subword pieces) in reading order.

User Profile

A device-local, non-biometric aggregated record (e.g., per-session normalized scores or quality flags, TCPM, pause statistics, retry counts, text-to-audio alignment error statistics, calibration data). It expressly excludes raw audio, spectrograms, embeddings, logits, and biometric templates. It is encrypted at rest. It is purgeable under the retention window. It updates only between evaluation sessions. All writes are mediated by the deterministic controller and logged. It is never transmitted or synced to any external system.

Voice-Activity Detector (VAD)

A local module that classifies audio frames as speech or non-speech using energy and spectral cues and device-stored thresholds, including a minimum silence length, to detect pauses. Used as an optional example detector within the acoustic front end.

Vision Encoder

An on-device module that converts an input image or video frame into non-text semantic descriptors (objects, actions, attributes, relations) with per-descriptor confidences, excluding optical character recognition.

WCPM (Words Correct Per Minute)

[Alias to TCPM for reporting. See TCPM.]

The invention claimed is:

1. A computer-implemented system executing entirely on a local device, comprising at least one processor and a non-transitory memory storing instructions that, when executed, cause the device to perform a fluency evaluation comprising:

presenting a reading prompt and capturing a spoken response;

providing the captured audio to an automatic speech recognition (ASR) component and to a processor that extracts prosodic features;

receiving, from the ASR executing in an isolated environment through a schema-restricted interface validated against a device-stored schema that exposes only tokens, per-token timestamps, and per-token confidence values and excludes raw audio and model-internal signals, a transcription aligned to a device-stored expected token sequence;

computing a first feature vector by extracting prosodic features from the captured audio;

computing a second feature vector solely from the tokens, per-token timestamps, and per-token confidence values;

evaluating device-stored gates comprising at least a per-token confidence threshold, a text-to-audio alignment error limit computed from the per-token timestamps and an expected token-timing schedule, and a speech-coverage fraction minimum, and responsive to any gate failing, withholding scoring and emitting a reason-coded quality flag; and responsive to the gates passing, fusing the first and second feature vectors using a predetermined combination function that operates only on their final vector outputs, without exchanging intermediate features or parameters, to produce a composite score, mapping the composite score to a normalized fluency score using a grading function whose parameters remain session-fixed and that is monotonic nondecreasing, to produce an evaluation outcome; and storing the evaluation outcome and any fluency-metadata set solely in device-local memory encrypted at rest and purgeable within a retention window, without transmitting the captured audio, the ASR-derived metadata, the fluency-metadata set, or the evaluation outcome to any external system.

2. The system of claim 1, wherein the ASR executes in a separate process, container, or virtual machine and the fluency evaluation executes outside that environment, the components communicating only through the schema-restricted interface limited to tokens, per-token timestamps, and per-token confidence values.

3. The system of claim 1, wherein the ASR and fluency evaluation execute in a single process under a restricted in-process interface that enforces the device-stored schema and excludes access to raw audio, embeddings, logits, per-frame acoustic features, and other model-internal signals.

4. The system of claim 1, wherein the predetermined combination function assigns increased weight to indicators within the second feature vector that correspond to tokens designated as high-frequency according to a device-stored, language-specific, versioned token-frequency list, the combination function operating only on the first and second feature vectors within the fluency evaluation.

5. The system of claim 1, wherein the text-to-audio alignment error is computed by a device-stored alignment function and the speech-coverage fraction is computed by an acoustic front end using a device-stored minimum silence length.

6. The system of claim 1, wherein the system identifies a lexical unit as a bounded sequence of tokens using device-stored punctuation rules, silence gaps longer than a device-stored minimum, or segmentation markers, associates the lexical unit with start and end timestamps derived from the per-token timestamps, and computes the textual and timing indicators, prosodic features, and device-stored gates at a lexical-unit level and at a sentence level before any fusion in the fluency evaluation.

7. The system of claim 1, wherein execution of evaluation, scoring, and feedback is mediated by a deterministic state-transition controller that conditionally invokes computations in parallel based on a session-state vector and a device-stored policy;

enforces device-stored guards comprising a sentence-level ASR confidence threshold, an acoustic front end silence-length threshold, and a latency budget;

rejects tool or model invocations not listed in a device-stored tool allowlist; and outputs the normalized fluency score or the quality flag within a device-stored latency budget measured from the utterance end as identified by an acoustic front end.

8. The system of claim 1, wherein the device maintains, solely in device-local memory, a plurality of user profiles keyed by a local, non-biometric profile identifier, each profile storing a reading level and the device further storing a reading-level map that maps the evaluation outcome to bounds on at least sentence token count, token-frequency band, and syntactic depth, the profiles being encrypted at rest, purgeable under a device-stored retention window, and never transmitted or synchronized with any external system; and wherein a selected profile is loaded at session start to initialize adaptation parameters, with all profile-derived parameters remaining session-fixed during evaluation.

9. The system of claim 1, further comprising a prosodic-quality gate that, prior to any fusion or scoring, withholds the normalized fluency score and emits the reason-coded quality flag responsive to the prosodic-quality gate indicating a failure state, a prosodic-quality gate being defined by device-stored thresholds for one or more of:

background-noise level exceeding a device-stored maximum; a pitch-variance metric falling below a device-stored minimum; or a pause-duration metric exceeding a device-stored maximum.

10. A computer-implemented method executed entirely on a local device, comprising:

capturing a spoken response and concurrently providing the same captured audio to an automatic speech recognition (ASR) component and to an acoustic front end that extracts prosodic features;

receiving, from the ASR component executing in an isolated environment and communicating only through a schema-restricted interface limited to tokens, per-token timestamps, and per-token confidence values validated against a device-stored schema and excluding raw audio, embeddings, logits, per-frame acoustic features, and other model-internal signals, a transcription of the spoken response;

computing a first feature vector from the captured audio by extracting prosodic features using the acoustic front end;

computing a second feature vector solely from the tokens, per-token timestamps, and per-token confidence values after aligning the transcription to the device-stored expected token sequence, by deriving textual and timing indicators relative to the expected token sequence, the indicators including per-token correctness, substitution rate, insertion rate, omission rate, and tokens-correct-per-minute (TCPM);

evaluating device-stored gates including at least a per-token confidence threshold, a sentence-level confidence threshold derived solely from the per-token confidence values and per-token timestamps, a text-to-audio alignment error computed from the per-token timestamps and the device-stored expected token-timing schedule, and a speech-coverage fraction minimum;

responsive to any gate failing, withholding scoring and emitting a quality flag;

responsive to the gates passing, fusing the first and second feature vectors using a predetermined combination function that operates only on their final vector outputs, without exchanging intermediate features or parameters, with parameters that remain session-fixed, to produce a composite score;

mapping the composite score to a normalized fluency score using a grading function whose parameters remain session-fixed and that is monotonic nondecreasing;

producing an evaluation outcome comprising the normalized fluency score; and storing, in device-local memory, the evaluation outcome and any fluency-metadata set, without transmitting the captured audio, the ASR-derived metadata, the fluency-metadata set, or the evaluation outcome to any external system.

11. The method of claim 10, further comprising processing the captured audio with an acoustic front end that identifies speech regions and extracts prosodic features using a device-stored minimum silence length for pause detection to form a first feature vector comprising pause duration, fundamental frequency, fundamental frequency variation, a pitch-variance metric computed from variation of fundamental frequency across consecutive tokens, root-mean-square energy, and speech rate measured as tokens per minute or syllables per second for use only within the fluency evaluation, wherein the prosodic features are extracted independently of the tokens, per-token time-stamps, and per-token confidence values received from the ASR component through the schema-restricted interface, and, prior to any fusion or scoring, withholding the normalized fluency score and emitting the quality flag with a device-stored reason code responsive to a prosodic-quality gate indicating a failure state, the prosodic-quality gate being defined by device-stored thresholds for one or more of: background-noise level exceeding a device-stored maximum; a pitch-variance metric falling below a device-stored minimum; or a pause-duration metric exceeding a device-stored maximum.

12. The method of claim 11, wherein pause duration and speech-coverage fraction are computed by the acoustic front end operating on the captured audio using a device-stored minimum silence length; and wherein the first feature vector is computed from the captured audio independent of the tokens, per-token timestamps, and per-token confidence values.

13. The method of claim 10, wherein the prosodic features are computed without accessing the tokens, per-token timestamps, or per-token confidence values and the textual and timing indicators are computed without accessing the captured audio or any acoustic feature, and fusing the first feature vector with the textual and timing indicators occurs only after the device-stored gates pass using a predetermined combination function that operates only on their final vector outputs, without exchanging intermediate features or parameters, to produce a composite score; and mapping the composite score to a normalized fluency score using the grading function to produce the evaluation outcome.

14. The method of claim 10, wherein the engagement condition is detected solely from prosodic features of the first feature vector prior to any fusion or scoring, further comprising detecting an engagement condition when at least one of a pitch-variance metric falls below a device-stored minimum, an RMS energy variance metric falls below a device-stored minimum, or a pause-duration metric exceeds a device-stored maximum, and, responsive to detecting the engagement condition, classifying the condition as a non-fluency failure in the evaluation outcome, presenting a retry prompt and suppressing reading-level adaptation until a subsequent evaluation meets device-stored thresholds.

15. The method of claim 10, wherein presentation of any retry prompt is gated by device-stored thresholds on both the normalized fluency score and the sentence-level ASR confidence and, when either threshold is not met, the method emits only the quality flag with a device-stored reason code, records a non-scored evaluation outcome and blocks retry and reading-level adaptation.

16. The method of claim 10, further comprising identifying a lexical unit as a bounded sequence of tokens using device-stored punctuation rules, silence gaps longer than a device-stored minimum, or segmentation markers, associating the lexical unit with start and end timestamps derived from the per-token timestamps, and computing the indicators, prosodic features, and device-stored gates at a lexical-unit level and at a sentence level before any fusion.

17. The method of claim 10, wherein tokens designated as high-frequency per a device-stored, language-specific, versioned token-frequency list receive increased weight in computing the textual and timing indicators, the weighting being applied within the second analysis path;

fusion occurs only after both paths are computed and the device-stored gates pass, with weights remaining session-fixed during the evaluation session.

18. The method of claim 10, further comprising enforcing a retry suppression window and a maximum retry count per sentence or utterance by a deterministic state-transition controller, wherein the controller suppresses presentation of any retry prompt for at least a device-stored minimum interval after a score or prior retry and blocks further retries when a device-stored maximum retry count is reached, with all retry budgets and timers stored and enforced solely on the device and referenced by the fluency evaluation.

19. The method of claim 10, further comprising selecting a local user profile using a device-stored identifier;

reading from the profile a reading level and reading, from device storage, a reading-level map;

initializing adaptation parameters for the session from the stored values;

using only the evaluation outcome to update the profile between sessions, without transmitting the profile or any portion thereof to any external system.

20. The method of claim 10, further comprising:

receiving, on the device, an image or video frame;

extracting, on the device, non-text semantic descriptors from the image or frame using a vision encoder, optical character recognition being excluded, and discarding descriptors that fail a device-stored schema or fall below a device-stored confidence threshold;

validating the descriptors and any generated prompt against a device-stored schema and content policy and, when validation fails, withholding scoring and adaptation, emitting a quality flag with a device-stored reason code, and substituting a device-stored fallback prompt;

generating, on the device, a reading prompt whose lexical difficulty is mapped from the evaluation outcome using a device-stored reading-level map and a device-stored mapping rule;

limiting difficulty changes to at most one difficulty step per prompt; evaluating a spoken reading of the generated or fallback prompt using the fluency evaluation recited in claim 10; and purging the captured image and descriptors from device-local memory within a device-stored retention window.

21. The method of claim 10, further comprising enforcing, by a deterministic state-transition controller, a device-stored latency budget measured from an utterance end identified by the acoustic front end, and outputting either the normalized fluency score or a quality flag within the latency budget.

22. The method of claim 10, wherein the device generates, on the device, a comprehension prompt that references only tokens occurring in a most recent transcription;

receives a spoken response;

determines, using only ASR tokens, per-token time-stamps, and per-token confidence values and without storing raw audio, whether the spoken response satisfies a device-stored token-equivalence rule relative to an expected token sequence derived from the most recent transcription; and based on the determination and subject to a device-stored policy that limits difficulty changes to at most one step per prompt, selects a next reading prompt with its associated expected token sequence or adjusts a difficulty parameter.

23. A computer-implemented system wherein processing for fluency evaluation, gating, and scoring executes on a local device and wherein the system is configured such that any off-device computation, if present, excludes captured audio and any personally identifiable information (PII), biometric identifiers, and biometric templates and is limited to de-identified aggregate diagnostics, comprising:

at least one processor and a non-transitory memory storing instructions that, when executed, cause the system to:

obtain, on the device, an evaluation outcome comprising a normalized fluency score derived from automatic speech recognition (ASR) tokens, per-token time-stamps, and per-token confidence values, from prosodic features, or from a combination thereof, and a sentence-level ASR confidence derived solely from per-token confidence values and per-token timestamps;

determine whether to adapt a reading level based on device-stored dual thresholds on the normalized fluency score and the sentence-level confidence and, when either threshold is not met, withhold adaptation and emit a quality flag with a device-stored reason code;

when both thresholds are met, select and apply a reading-level adaptation that changes at least one of sentence token count, token-frequency band, or syntactic depth and is limited by a device-stored policy to at most one difficulty step per prompt; and store adapted prompt parameters solely in device-local memory encrypted at rest and purgeable within a device-stored retention window, and without transmitting any captured audio, ASR-derived metadata, the fluency-metadata set, the evaluation outcome, or the adapted prompt parameters to any external system.

24. The system of claim 23, wherein the processor suppresses presentation of any retry prompt unless both a normalized fluency score and a sentence-level ASR confidence each meet respective device-stored thresholds, and wherein, when either threshold is not met, the processor outputs only a quality flag with a device-stored reason code and blocks any reading-level adaptation and session progression, all gating operations and thresholds being maintained exclusively in device-local memory without transmission to any external system.

25. The system of claim 23, wherein before any display or playback the system validates outputs against a device-stored content policy and schema and replaces any failing output with a device-stored fallback validated against the policy and schema, and limits difficulty changes to at most one difficulty step per prompt.

26. The system of claim 23, wherein any off-device telemetry consists essentially of de-identified aggregate diagnostics including install counts, feature-usage counts, crash/error-code histograms, and application version, and excludes any captured audio, ASR-derived metadata, fluency-metadata sets, evaluation outcomes, adapted prompt parameters, user-profile contents, biometric data, precise geolocation, and any device or advertising identifiers or other persistent identifiers linkable to a natural person or to a persistent device.

\* \* \* \* \*